(12) United States Patent
Kolor et al.

(10) Patent No.: US 7,907,574 B2
(45) Date of Patent: Mar. 15, 2011

(54) CHANNEL SCHEDULING

(75) Inventors: Sergio Kolor, Haifa (IL); Gilad Bornstein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 960 days.

(21) Appl. No.: 10/768,845

(22) Filed: Jan. 29, 2004

(65) Prior Publication Data

US 2005/0180350 A1 Aug. 18, 2005

(51) Int. Cl.
*H04B 7/216* (2006.01)
*H04W 72/00* (2009.01)

(52) U.S. Cl. .................................... 370/335; 455/452.1

(58) Field of Classification Search .................. 370/280, 370/281, 331, 329, 320, 335; 455/452, 447, 455/450, 62, 63
See application file for complete search history.

(56) References Cited

U.S. PATENT DOCUMENTS

| | | | | |
|---|---|---|---|---|
| 4,244,046 A * | 1/1981 | Brouard et al. | ............... | 370/263 |
| 5,692,127 A * | 11/1997 | Devon | ........................ | 370/320 |
| 5,737,327 A * | 4/1998 | Ling et al. | ..................... | 370/335 |
| 6,028,853 A * | 2/2000 | Haartsen | ....................... | 370/338 |
| 6,229,795 B1 * | 5/2001 | Pankaj et al. | ................. | 370/329 |
| 6,459,703 B1 * | 10/2002 | Grimwood et al. | ........... | 370/442 |
| 6,735,185 B1 * | 5/2004 | Noneman | ..................... | 370/335 |
| 7,009,949 B1 * | 3/2006 | Gopalakrishnan et al. | ... | 370/329 |
| 7,050,463 B1 * | 5/2006 | Cho et al. | ..................... | 370/476 |
| 7,139,284 B1 | 11/2006 | Furukawa et al. | | |
| 7,505,788 B1 * | 3/2009 | Narasimhan | ............... | 455/562.1 |
| 2002/0136274 A1 * | 9/2002 | Proctor et al. | ................ | 375/142 |
| 2002/0137327 A1 | 9/2002 | Arakawa | | |
| 2002/0183064 A1 * | 12/2002 | Gopalakrishnan et al. | ... | 455/452 |
| 2003/0086393 A1 * | 5/2003 | Vasudevan et al. | ........... | 370/330 |
| 2003/0109257 A1 * | 6/2003 | Nilsson et al. | ................ | 455/436 |
| 2003/0210674 A1 | 11/2003 | Honkasalo et al. | | |
| 2003/0228874 A1 * | 12/2003 | Mallette | ....................... | 455/508 |
| 2003/0231586 A1 | 12/2003 | Chheda | | |
| 2005/0128964 A1 * | 6/2005 | Tiedemann et al. | .......... | 370/278 |

FOREIGN PATENT DOCUMENTS

| | | |
|---|---|---|
| CN | 1256558 | 6/2000 |
| EP | 1009110 | 6/2000 |
| JP | 8509590 T | 10/2008 |
| WO | 9835514 | 8/1998 |
| WO | 0111897 | 2/2001 |
| WO | WO0209320 A2 | 1/2002 |
| WO | WO03009099 A2 | 1/2003 |

OTHER PUBLICATIONS

International Search Report and Written Opinion-PCT/US2005/003005, International Search Authority-European Patent Office, Jun. 23, 2005.

\* cited by examiner

*Primary Examiner* — George Eng
*Assistant Examiner* — Christopher M Brandt
(74) *Attorney, Agent, or Firm* — Sandip S. Minhas; Mary Fales

(57) ABSTRACT

A method for transmitting data in a code division multiple access (CDMA) communication network, consisting of allocating a common Walsh code to a group of transceivers, and allocating a respective, different long code to each transceiver in the group. The method further includes time-multiplexing transmission of the data to the transceivers in the group by applying the common Walsh code and the respective long code of each transceiver to data packets directed to the transceivers so as to form multiplexed data packets. The multiplexed data packets are transmitted in sequence over the network to the group of transceivers.

38 Claims, 9 Drawing Sheets

FIG. 4

| ACTIVE CHANNEL POOL ||||| 
|---|---|---|---|---|
| CHANNEL i | IDENTITY $H_i$ | RATE $r_i$ | WALSH CODE $W_i$ | MAXIMUM POWER $P_i$ |
| 1 | 0x12345678 | 153.6kbps | WALSH 2(LEN 8) | −5 dB |
| 2 | ⋮ | ⋮ | ⋮ | ⋮ |
| 3 | ⋮ | ⋮ | ⋮ | ⋮ |
| 4 | ⋮ | ⋮ | ⋮ | ⋮ |
| ⋮ | ⋮ | ⋮ | ⋮ | ⋮ |

80

| CHANNEL NUMBER ||
|---|---|
| RATE r | NUMBER OF CHANNELS $D_r$ |
| 1x | ⋮ |
| 2x | ⋮ |
| 4x | ⋮ |
| 8x | ⋮ |
| 16x | 1 |
| 32x | ⋮ |

82

| CHANNEL POWER ||
|---|---|
| RATE r | MAXIMUM POWER $RP_r$ |
| 1x | ⋮ |
| 2x | ⋮ |
| 4x | ⋮ |
| 8x | ⋮ |
| 16x | −3 dB |
| 32x | ⋮ |

84

PACKET CALLS

| IDENTITY $ID_k$ | $CI_k$ (C/I) | $A_k$ (ASSIGNED CHANNEL) | $T_k$ (AVERAGE THROUGHPUT RATE) | $S_k$ (CURRENT THROUGHPUT RATE) | $RR_k$ (REQUIRED RATE) |
|---|---|---|---|---|---|
| ⋮ | ⋮ | ⋮ | ⋮ | ⋮ | ⋮ |
| 0x87654321 | −4 | 0x12345678 | 92.16kbps | 153.6kbps | 153.6kbps |
| ⋮ | ⋮ | ⋮ | ⋮ | ⋮ | ⋮ |
| ⋮ | ⋮ | ⋮ | ⋮ | ⋮ | ⋮ |

140

CHANNEL ALLOCATION

| IDENTITY $H_i$ | RATE $r_i$ | WALSH CODE $W_i$ |
|---|---|---|
| ⋮ | ⋮ | ⋮ |
| 0x12345678 | 153.6kbps | WALSH 2(LEN 8) |
| ⋮ | ⋮ | ⋮ |

142

C/I RANGES

| C/I RANGE | CHANNEL REQUIRED RATE RR |
|---|---|
| ·· — ·· | 1x |
| ·· — ·· | 2x |
| ·· — ·· | 4x |
| ·· — ·· | 8x |
| −5 — −4 | 16x |
| ·· — ·· | 32x |

144

CHANNEL SCHEDULING

FIELD OF THE INVENTION

The present invention relates generally to cellular telephone communications, and specifically to allocation of channels during such communication.

BACKGROUND OF THE INVENTION

As demand for bandwidth increases for cellular communications, in particular for data packet transfers, allocation of resources within the limited bandwidth available becomes more difficult. In order to be useful, the allocation needs to satisfy a number of often conflicting, and not necessarily well defined, criteria. Such criteria include a concept of fairness, where all users requiring a data packet transfer service are allocated the limited packet resources on a generally "equal" basis. In such a fair distribution of resources no specific user is allocated substantially more or less resources than an "average" allocation, in any time frame where the allocation is performed. The concept of fairness may be applied to users having very different transmission and reception conditions, for example by allocating more resources to a user with poor reception conditions. Application of a particular fairness concept to a group of users may have to take into account, inter alia, different levels of service to which users in the group are entitled, for example, by some of the users in the group having subscribed to a premium service.

A further criterion applied in allocating resources is maximization of throughput rate. It will be appreciated that total throughput rate and fairness typically conflict. As an extreme example, to achieve maximum throughput rate, all resources may be allocated to a user having good reception conditions who is thus able to receive data at a high rate, with no resources being allocated to a user who is able to receive data only at a low rate. Such an allocation achieves maximum throughput rate at the expense of a completely unfair allocation.

Other criteria which an efficient bandwidth allocation system should consider include ability to react quickly to changing demands and conditions, a minimum transfer of management or related resources, and a relatively simple design to limit implementation risks.

Systems for allocating bandwidth for data packet transfer according to some of the above criteria are known in the art. For example, U.S. Pat. No. 6,449,490 to Chaponniere, et al, whose disclosure is incorporated herein by reference, describes a method for determining to which users access to a communication system is to be provided. The description takes into effect both fairness and throughput rate criteria described above.

U.S. Pat. No. 6,657,980 to Hotzmann, et al, whose disclosure is incorporated herein by reference, describes a method for scheduling packet data transmissions where a user priority function is based on a channel condition indicated by data rate requests. The method also considers fairness criteria dictated by predetermined Quality of Service requirements.

Notwithstanding the above, an improved allocation system which takes account of all the criteria described would be advantageous.

SUMMARY OF THE INVENTION

It is an object of some aspects of the present invention to provide a method and apparatus for allocating data channels in a code division multiple access (CDMA) cellular network.

In embodiments of the present invention, mobile transceivers, herein termed mobiles, in a CDMA network are dynamically allocated a limited number of data channels, i.e., channels which are specific for data packet transfer to the mobiles. A central transceiver divides the mobiles into groups according to reception conditions at the mobiles, each of the groups having a specific data transfer rate. One or more Walsh codes are allocated to the mobiles of each group, thereby respectively defining one or more data channels, each with a respective Walsh code. The mobiles within each data channel are allocated respective long codes. The long code is generated by a long code mask, and is a unique code assigned to each mobile that is applied to data transmitted to or by the mobile, as is known in CDMA systems.

The central transceiver implements data packet transfer to the mobiles within each specific channel by time multiplexing the channel. The multiplexing is implemented by applying the common Walsh code of the channel, and the long code assigned to a chosen mobile, to a data packet directed to the chosen mobile. Applying both codes enables only the chosen mobile to decode the packet; all other mobiles, even those within the same channel, are unable to decode the packet. By using the long code assigned to the mobiles to implement the time division multiplexing, the multiplexing can be performed with virtually no extra signaling to the mobiles, enabling multiplexing within very short time periods. Furthermore, since the same Walsh code can be shared by virtually any number of mobiles, the number of mobiles that can be multiplexed within one channel is substantially unlimited.

The central transceiver typically compiles data throughput rates of the mobiles, and periodically chooses one of the mobiles based on the throughput rates and the reception conditions. The transceiver then transmits data to this mobile. The method of multiplexing ensures a fair distribution of data throughput rates to all the mobiles by maximizing a product of their throughput rates over time.

The central transceiver typically apportions the data channels substantially equally between the groups. The total number of data channels provided is preferably determined after voice traffic channels have been allocated by the central transceiver. The total number thus depends on the excess power available to the central transceiver, as well as other system resources available to the transceiver, such as available Walsh codes.

The present invention will be more fully understood from the following detailed description of the embodiments thereof, taken together with the drawings, a brief description of which is given below.

BRIEF DESCRIPTION OF THE DRAWINGS

FIG. 4 illustrates tables maintained by a forward supplemental channel manager, according to an embodiment of the present invention;

DETAILED DESCRIPTION OF EMBODIMENTS

Figure 1:
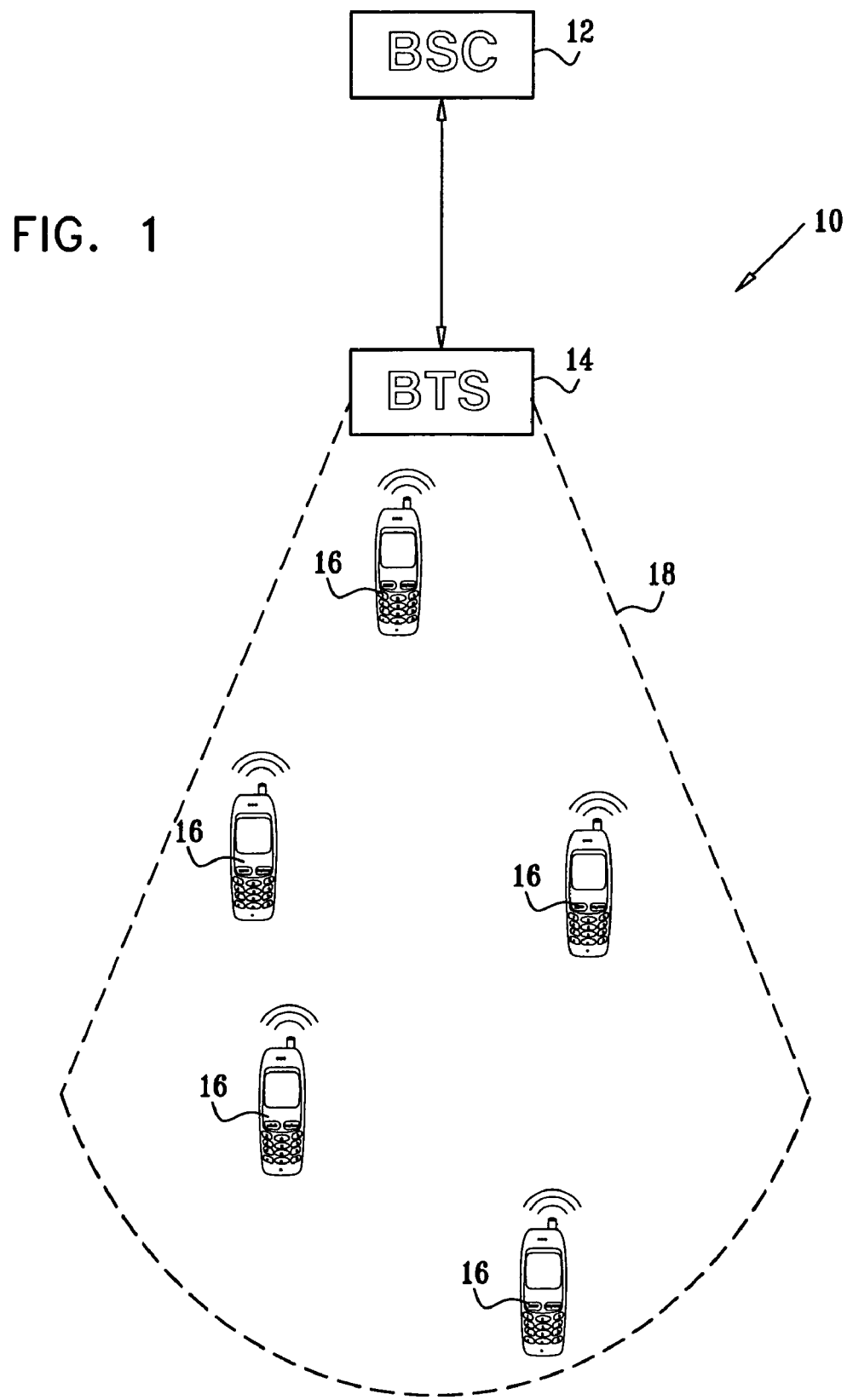
FIG. 1 is a schematic illustration of a cellular network system, according to an embodiment of the present invention.

Reference is now made to FIG. 1, which is a schematic illustration of a network system 10, according to an embodiment of the present invention. System 10 operates according to a code division multiple access (CDMA) protocol, typically an industry-standard CDMA protocol such as a CDMA2000 protocol provided by the Telecommunications Industry Association of Arlington, Va. System 10 typically comprises a cellular communication network. It will be appreciated, however, that system 10 may comprise other types of communication network operating according to a CDMA protocol. Such types include, but are not limited to, wireless networks comprising mobile transceivers and/or networks comprising transceivers physically coupled, by communication cables such as conductive cable and/or optical fibres, to a central radio transmitter of the network. Hereinbelow, by way of example, system 10 is assumed to comprise a wireless cellular network comprising mobile transceivers.

A base station controller (BSC) 12 communicates with a base station transceiver subsystem (BTS) 14, and typically with other BTSs, not shown for clarity in FIG. 1. BTS 14 acts as a radio transmitter which communicates with generally similar mobiles 16 in a region 18 specific to the BTS, typically one or more sectors of the BTS. Hereinbelow region 18 is assumed, by way of example, to comprise one sector, and is also referred to as sector 18.

As communication between BTS 14 with each mobile 16 initiates, either from a mobile originated call or from a mobile terminated call, one or more traffic channels are allocated for the communication. The allocation depends on the type of traffic, i.e., voice and/or data. An operator of system 10 typically prioritizes allocation of voice channels to be higher than data channels, although this is not necessarily always the case. Each channel is directional, i.e., is either a forward channel (from the BTS to the mobile) or a reverse channel.

The allocation of a channel comprises allocation of a Walsh code and of a "long" code, the two codes together forming a unique set. Although in theory there is no limit to the length of the Walsh code, longer codes consume more BSC resources. In practice, the length of each code is defined by the protocol; the Walsh code is set according to the data rate, and the long code mask generating the long code, to 42 bits, although any other suitable lengths may be used. The codes are applied to a packet—either data or voice—at the transmitter. The receiver to which the packet is directed, i.e., the receiver using the common Walsh code and long code, decodes the coded packet using the unique set of codes, and is therefore able to use the packet. A receiver using the common Walsh code but a different long code decodes the packet; however, because it has a different long code, such a receiver is unable to use the packet, and so effectively rejects the decoded packet.

At initiation of communication between a specific mobile 16 and BTS 14, the BTS is able to determine an optimal power level at which to transmit forward signals to the mobile, and to set a power level at which the mobile transmits. In the forward direction, the power transmitted from the BTS, for good reception, depends on the location of each mobile 16 with respect to BTS 14. During transmission of the signals, each mobile 16 varies the power it transmits on a particular reverse channel, according to signals the mobile receives from BTS 14. In general, the more distant a specific mobile 16 is from the BTS, the higher the transmitted power.

It is assumed herein that in transmitting data in a forward direction to mobiles 16, BTS 14 is able to transmit the data at a plurality of rates defined by an equation (1):

$$r = N \cdot R \tag{1}$$

where r is the data transfer rate at which the data is transmitted,

N is a number, and

R is a fundamental rate at which data is transmitted.

Hereinbelow, by way of example, N is assumed to be chosen from $\{1, 2, 4, 8, 16, 32\}$ and R is assumed to be approximately equal to 9.6 Kb/s. It will be understood, however, that N may take other values including fractional values, and that R may comprise any other suitable fundamental rate of data transmission.

Figure 2:
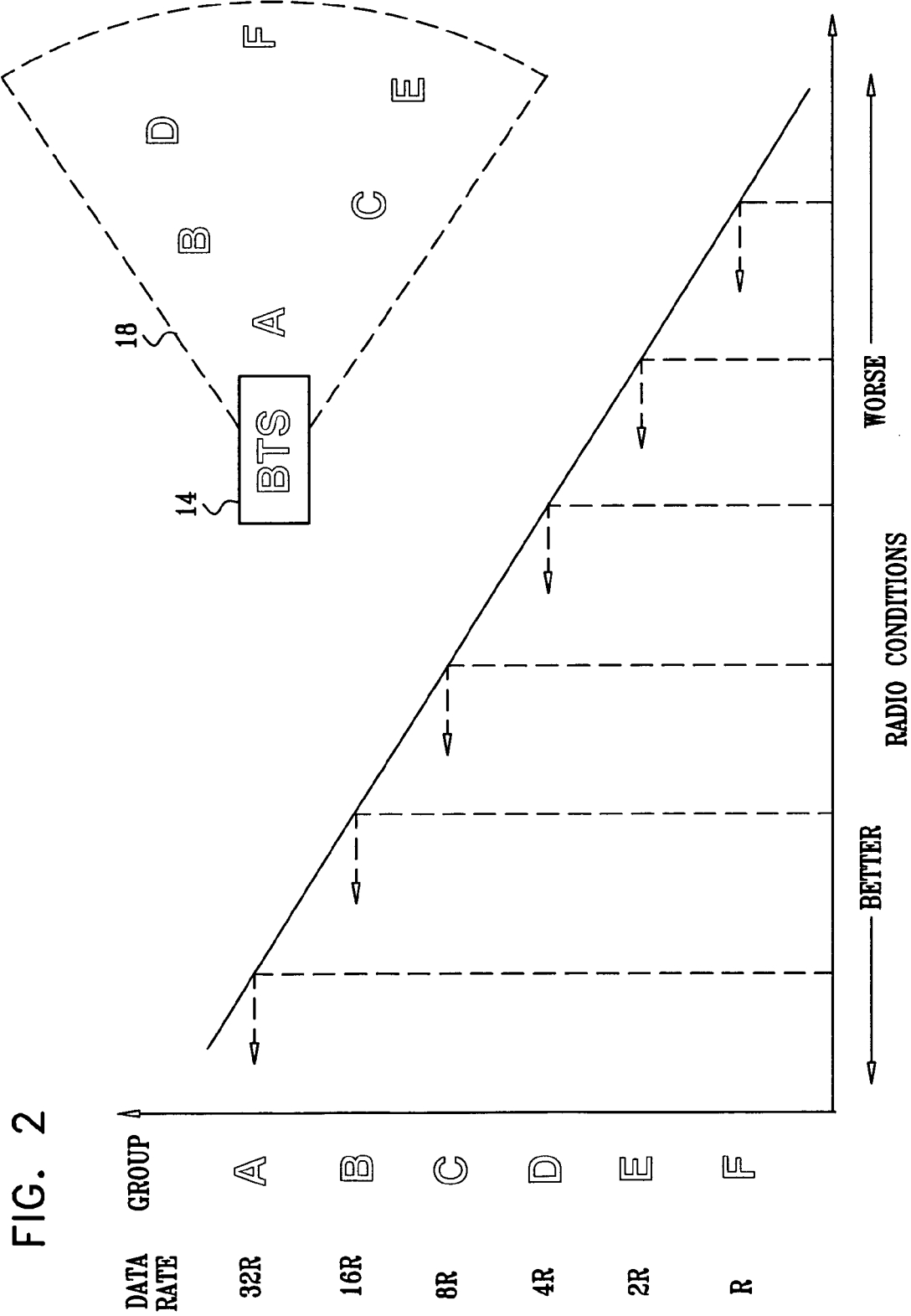
FIG. 2 illustrates a method for distributing mobiles in a sector of the system of FIG. 1, according to an embodiment of the present invention.

FIG. 2 illustrates a method for distributing mobiles 16 in sector 18, according to an embodiment of the present invention. Mobiles 16 in sector 18 are divided into six groups A, B, C, D, E and F, herein also referred to collectively as groups S. Groups A, B, C, D, E and F have progressively poorer radio reception conditions. In allocating forward channels for data transmission, herein also referred to as forward supplemental channels, an allocation system, operated by a combination of BTS 14 and BSC 12 and described in more detail below, assumes that mobiles 16 are approximately evenly distributed within groups S. The allocation system gives optimal results in terms of fairness and throughput rate for such an approximately even distribution; however, the results for uneven distributions that are not extreme are expected to be comparable.

Other factors being the same, extra power is needed to transmit data at higher rates. In order to maintain approximately relatively even power distribution for forward supplemental channel transmissions over groups A, B, C, D, E and F, the data transfer rates r allocated to the groups are typically respectively 32R, 16R, 8R, 4R, 2R, and R. It will be appreciated that such an allocation compensates for increased error rate of data reception as the radio reception conditions of the groups worsen, while maintaining the approximately even power distribution.

Figure 3:
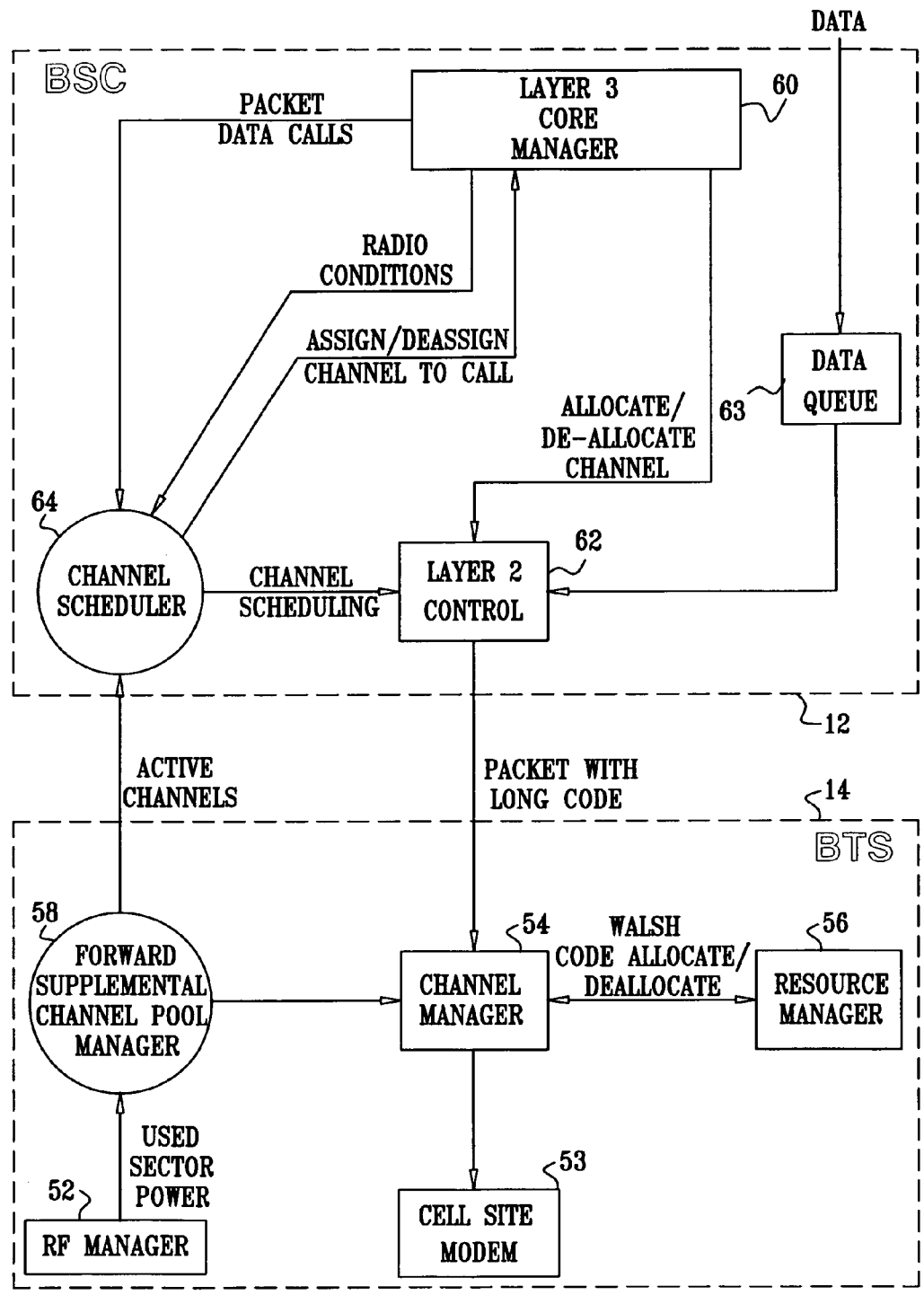
FIG. 3 is a block diagram of the architecture of a system for allocating forward supplemental channels, according to an embodiment of the present invention.

FIG. 3 is a block diagram of the architecture of a system 50 for allocating forward supplemental channels, according to an embodiment of the present invention. Components of system 50 are typically divided between BSC 12 and BTS 14. In an embodiment BTS 14 comprises a radio-frequency (RF) manager 52, a forward supplemental channel pool (FSCP) manager 58, a channel manager 54, a resource manager 56, and a cell site modem (CSM) 53; BSC 12 comprises a channel scheduler 64, a layer 3 core manager 60, and a layer 2 control 62 which typically manages a data link layer and a medium access control (MAC) layer. BSC 12 also comprises a data queue 63.

RF manager 52 measures on a substantially continuous basis power levels of signals at the antenna of BTS 14. RF manager 52 uses the evaluated power to convey to FSCP manager 58 a value of the power used in sector 18, the used sector power (USP). RF manager 52 recalculates and conveys USP to FSCP manager 58 periodically, typically with a period of approximately 20 ms. USP is used by manager 58 to calculate a free sector power. The free sector power corresponds to the power available to BTS 14, above that power which the BTS is using for voice and forward supplemental channels that have already been allocated.

Manager 58 uses the free sector power to maintain and track a pool of active forward supplemental channels, as is described in more detail below with respect to FIGS. 4, 5, and 6. Typically, the FSCP manager operates relatively slowly, generating a new pool of forward supplemental channels in a period of the order of a second. FSCP Manager 58 uses the results of its calculations to notify allocation or de-allocation of forward supplemental channels to channel manager 54. The FSCP manager also conveys the channel pool structure to channel scheduler 64.

Channel scheduler 64 time multiplexes each of the channels in the pool according to inputs, including new packet data calls and changes in user radio conditions, received from layer 3 core manager 60, as is described in more detail below with respect to FIGS. 7-10. Output of the scheduler is passed back to the core manager, so that the manager can assign or remove channels from mobiles, via layer 2 control 62. Scheduling output, i.e., the time multiplexing, produced by the scheduler is passed directly to control 62.

Data packets are stored in data queue 63, until they are made available to control 62. Control 62 applies the scheduling output to a data packet directed to the scheduled user, by incorporating the long code of the user into the packet, and the packet is transmitted via cell site modem 53. After transmission of one packet, the process of choosing the scheduling output repeats. The time multiplexing is thus implemented by using the long code. Control 62 transfers the multiplexed data packet to channel manager 54, which uses resource manager 56 to allocate a Walsh code for the channel. The Walsh code is applied to the multiplexed packet before the packet is transmitted.

It will be appreciated that using the long code to implement the time multiplexing of each channel considerably reduces overall signaling to the mobiles being multiplexed, compared to multiplexing systems known in the art. There is substantially no signaling needed while the mobile is allocated a specific channel, and substantially the only signaling required is for allocation or de-allocation of the channel.

FIG. 4 illustrates tables 80, 82 and 84 maintained by FSCP manager 58, according to an embodiment of the present invention.

Active channel pool table 80 comprises values for each active forward supplemental channel i, where i is a whole number, operating in sector 18. Each channel i in table 80 comprises an identity $H_i$, also termed a channel handle, a rate $r_i$ defined by expression (1), a Walsh code $W_i$, and a maximum forward power $P_i$ to be used by the channel.

Channel number table 82 lists the number $D_r$ of forward supplemental channels assigned to each rate r defined by equation (1).

Channel power table 84 comprises channel rates r (equation (1)) and corresponding required maximum powers $RP_r$ assigned for rate r. $RP_r$ is the maximum power that may be used for a forward supplemental channel transmitting at rate r. The values of $RP_r$ are typically pre-set by the operator of system 10.

Figure 5:
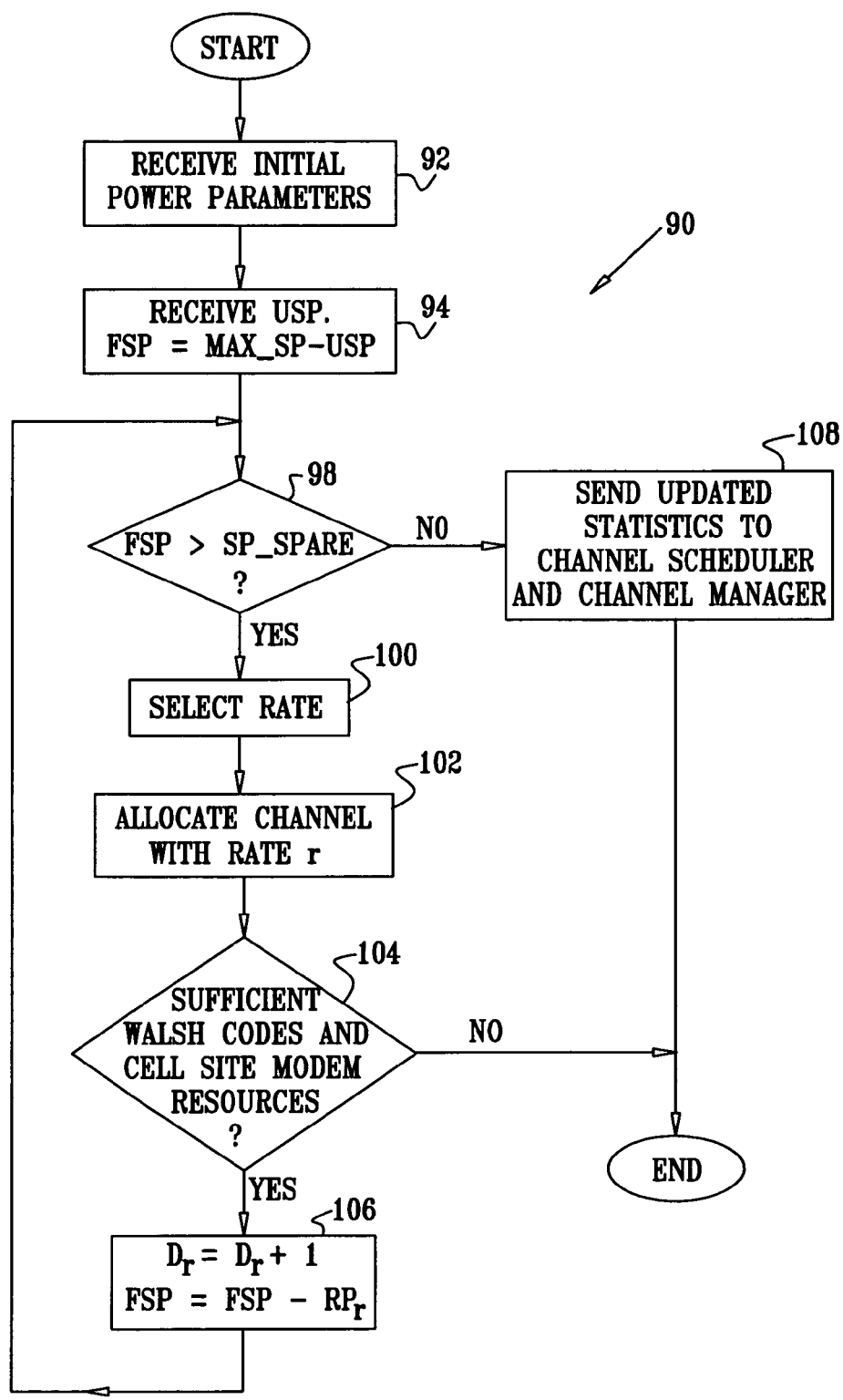
FIG. 5 is a flowchart showing steps performed by the forward supplemental channel manager to maintain tables of FIG. 4, according to an embodiment of the present invention.

FIG. 5 is a flowchart 90 showing steps performed by FSCP manager 58 to maintain tables 80 and 82, according to an embodiment of the present invention. Flowchart 90 adds or removes channels from table 80, and updates table 82 accordingly. Manager 58 implements flowchart 90 periodically, typically at approximately one second intervals, although any other suitable interval may be used.

In an initial step 92 of flowchart 90, manager 58 uses the following input parameters:

Sector Power Spare (SP_SPARE). SP_SPARE is a limiting threshold power, typically pre-set by the operator of system 10, that is available for use as additional voice channels in sector 18. Assigning an appropriate value to SP_SPARE enables the operator to set a higher priority to voice channels compared to data channels.

Maximum Sector Power (MAX_SP). MAX_SP is a maximum allowable transmission power for sector 18.

Sector Power High Threshold (SP_HI_THR). SP_HI_THR is an upper threshold of power that FSCP manager 58 uses to limit the amount of power assigned to supplemental channels. If SP_HI_THR is exceeded, supplemental channels are typically removed.

In a second step 94 manager 58 receives USP from RF manager 52, as described above with reference to FIG. 3, and calculates a value of Free Sector Power (FSP). FSP corresponds to a power that may be available to manager 58 for supplemental channels. FSP is calculated according to equation (2):

$$FSP = MAX\_SP - USP \qquad (2)$$

In a decision step 98, manager 58 compares the value of FSP with SP_SPARE. If FSP>SP_SPARE, showing there is power available for supplemental channels, manager 58 continues to step 100.

In step 100 a rate is selected. The rate is selected by examining values in tables 82 and 84. In table 84, all rates r wherein $RP_r$<FSP are determined. From table 82, the values of $D_r$ for each of the rates r found from table 84 are found. The rate having the minimum value of $D_r$ is used as the selected rate; if more than one minimum value of $D_r$ exists, the lowest rate is chosen as the selected rate.

In a step 102 a supplemental channel is provisionally allocated to the rate selected in step 100.

In a decision step 104 manager 58 checks to see that there are sufficient Walsh codes and also that there are sufficient cell site modem resources available for any extra channel. If there are insufficient Walsh codes or CSM resources, manager 58 ends flowchart 90.

If decision step 104 returns a positive answer, the number of channels $D_r$ of the rate selected in step 100 is incremented. A new entry is generated in table 80, and table 82 is updated. The value of FSP is decreased by the value of $RP_r$, and the flowchart returns to decision step 98. Manager 58 continues to implement steps 100, 102, and 106 (assuming decision 104 returns Yes) until FSP≦SP_SPARE in decision 98, showing that there is no spare power available.

When FSP≦SP_SPARE, in a step 108 manager 58 sends the updated statistics of tables 80 and 82 to channel scheduler 64 and channel manager 54, and exits the flowchart.

Figure 6:
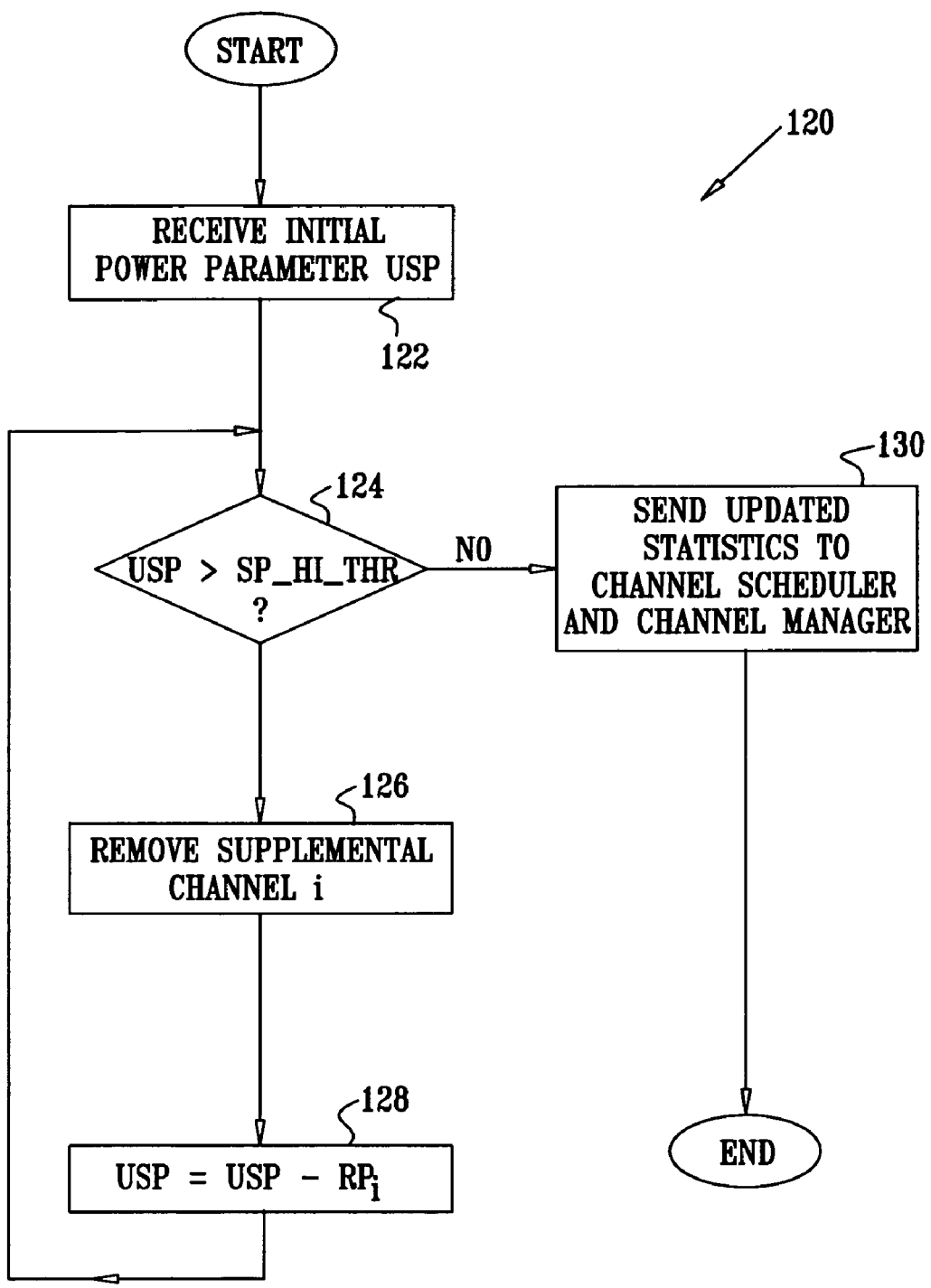
FIG. 6 is a flowchart showing steps performed by the forward supplemental channel manager to limit the number of forward supplemental channels, according to an embodiment of the present invention.

FIG. 6 is a flowchart 120 showing steps performed by FSCP manager 58 to limit the number of forward supplemental channels, according to an embodiment of the present invention. Flowchart 120 maintains the predominance of fundamental channels operated by system 10, by removing supplemental channels if the power requirement for fundamental channels increases. Flowchart 120 is implemented periodically, typically approximately every 20 ms, by manager 58.

In an initial step 122, manager 58 receives the value of USP from RF manager 52.

In a decision step 124, manager 58 checks if USP>SP_HI_THR. (SP_HI_THR is defined above with respect to FIG. 4.)

If USP>SP_HI_THR, then in a step 126 manager 58 removes a supplemental channel from table 80. The channel removed is preferably one with a rate r having the highest value of $D_r$. If there is more than one rate satisfying this criterion, then the channel is removed from the highest rate. Tables 82 and 84 are also updated.

In a step 128, the value of USP is decremented by the value of $RP_r$, the power of the removed channel, and the flowchart returns to decision step 124.

Manager 58 continues to operate flowchart 120 until USP≦SP_HI_THR, at which point, in a step 130 the updated values from tables 80, and 82 are transferred to channel scheduler 64 and channel manager 54. Manager 58 then exits the flowchart.

Typically, manager 58 implements flowcharts substantially similar to flowchart 120, mutatis mutandis, in order to ensure that the number of Walsh codes and the amount of CSM resources are limited.

It will be understood that flowchart 90 increases the number of channels, and that flowchart 120 decreases the number. Implementation of flowcharts 90, 120, and flowcharts similar to flowchart 120 as described above, enables manager 58 to allocate supplemental channels substantially evenly over the different rates of the channels, by apportioning Walsh codes between the different rates. Implementation of the flowcharts also limits the total number of supplemental channels according to the resources—including power, Walsh codes, and CSM resources—available after fundamental channels have been allocated.

Figures 7, 8:
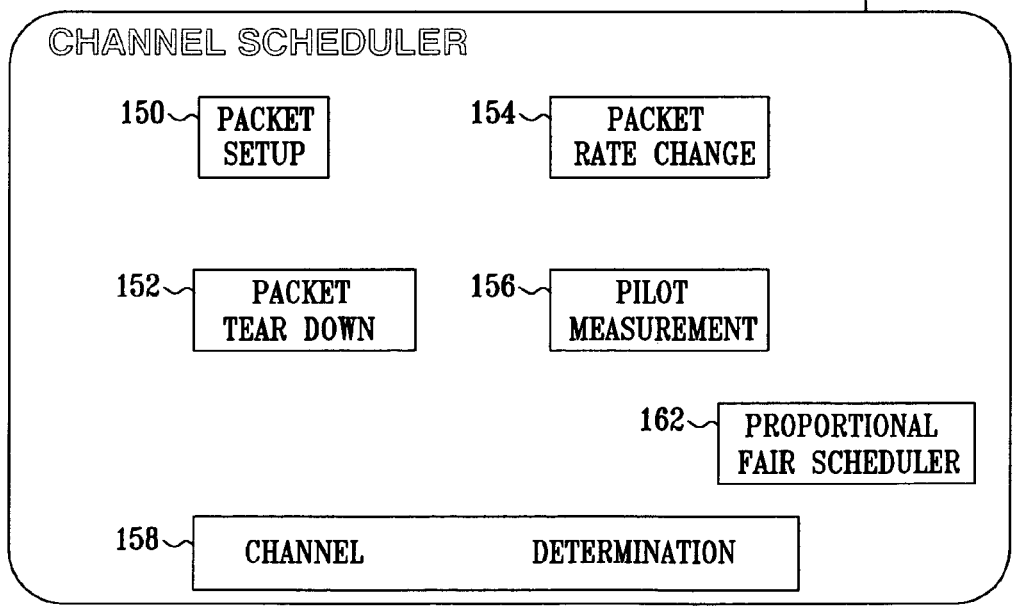
FIG. 7 illustrates tables maintained by a channel scheduler of the system of FIG. 3, according to an embodiment of the present invention.
FIG. 8 illustrates components of the channel scheduler, according to an embodiment of the present invention.

FIG. 7 illustrates tables maintained by channel scheduler 64, according to an embodiment of the present invention.

A call table 140 comprises details of packet data calls being transmitted by system 10. For each call k, where k is a whole number identifying the call, scheduler 64 maintains an identity $ID_k$ of the call, also herein termed a call handle, within table 140. Table 140 also comprises a $$\frac{\text{Carrier}}{\text{Interference}}$$

value $CI_k$, an identity $A_k$ of the channel assigned to call k, an average data throughput rate $T_k$ for the call, a data throughput rate $S_k$ for a current time slot, and a required rate $RR_k$—chosen from rates defined by equation (1)—for the call.

A channel table 142 comprises details of supplemental channels i used by scheduler 64 to transmit the calls listed in table 140. Entries in table 142 are derived from manager 58. Entries in table 142 comprise an identity $H_i$, a rate $r_i$, and a Walsh code $W_i$, corresponding to the respective entries in table 80, described above.

A C/I range table 144 comprises ranges of values of $$\frac{\text{Carrier}}{\text{Interference}}$$

for a call, and corresponding required rates RR at which the supplemental channel allocated to the call is required to transmit. The ranges of values of $$\frac{\text{Carrier}}{\text{Interference}}$$

are typically pre-set by the operator of system 10 at startup of the system.

FIG. 8 illustrates components of scheduler 64, according to an embodiment of the present invention. Scheduler 64 comprises two processes: a channel determination process 158 and a proportional fair scheduler process 162. Process 158 is described below with reference to FIG. 9; process 162 is described below with reference to FIG. 11. Scheduler 64 also comprises four procedures: a packet data call setup procedure 150, a packet data call tear-down procedure 152, a packet data call rate change procedure 154, and a pilot measurement procedure 156.

Call setup procedure 150 allocates a new entry k in call table 140. The procedure is activated when scheduler 64 receives an "allocate call" message from core manager 60. Manager 60 sends the allocate call message to scheduler 64 when a data call setup from the mobile 16 implementing the call is complete. The allocate call message includes a call identity and a power level, PILOT_STRENGTH, of the reference pilot of the call at call setup.

Typically, procedure 150 uses a pre-set function of PILOT_STRENGTH to estimate a value of $$\frac{\text{Carrier}}{\text{Interference}},$$

$CI_k$, for call k. Alternatively or additionally, procedure 150 estimates a value of $CI_k$ by another method, such as by a direct determination of the $$\frac{\text{Carrier}}{\text{Interference}}$$

value. The value of $CI_k$ is also measured during progress of a call, as described below with reference to pilot measurement procedure 156. Procedure 150 uses the value of $CI_k$ to find a channel rate and an assigned channel for call k, according to channel determination process 158.

Procedure 150 continues by informing core manager 60 (FIG. 3) of the assigned supplemental channel. Core manager 60 sends a notification of the assigned channel to the mobile 16 making the call k. The notification typically comprises an extended supplemental channel assignment message (ES-CAM) configured to assign the channel to the mobile for infinite time. After a guard time to allow the mobile to receive the message, proportional fair scheduler process 162 incorporates the assigned channel into its procedure. Manager 60 also notifies control 62 to add the channel to the call, so that the control formats a channel packet based on channel allocation table 142.

Tear-down procedure 152 is called by manager 60 when a call terminates. The procedure deletes the entry for the call from call table 140.

Pilot measurement procedure 156 is implemented periodically by scheduler 64 to determine the value of $CI_k$. During a call, BTS 14 transmits a request, the Periodic Measurement Request Order, to each mobile 16 to report its radio condition. The mobile provides in return pilot reception conditions via a Periodic Pilot Strength Measurement Message (PPSMM). The PPSMM includes the PILOT_STRENGTH. On reception of the PPSMM by core manager 60, the manager transfers the PPSMM to procedure 156, which uses the value of PILOT_STRENGTH in the PPSMM to calculate $CI_k$, substantially as described above for procedure 150.

Figure 9:
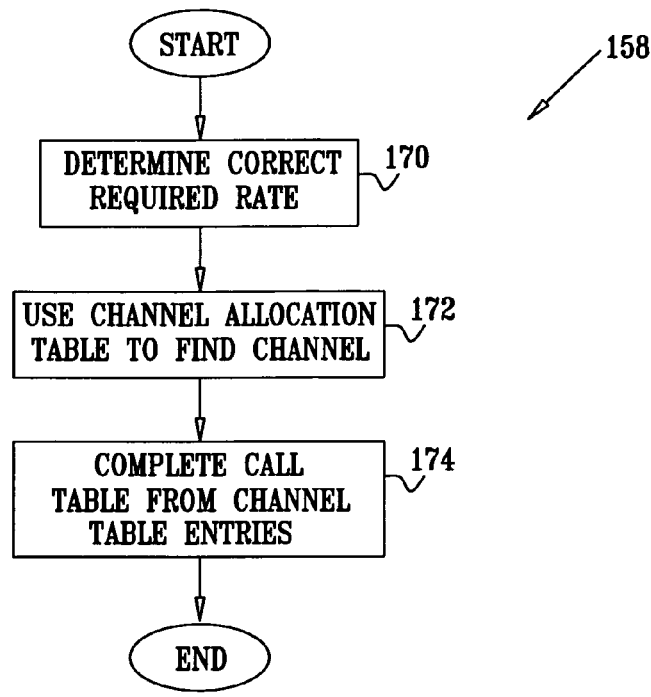
FIG. 9 is a flowchart showing steps for a channel rate determination method, according to an embodiment of the present invention.

FIG. 9 is a flowchart showing steps for channel determination process 158, according to an embodiment of the present invention.

In a first step 170, a maximum required rate $RR_k$ for call k is determined by finding the correct row for $CI_k$ in C/I Range table 144 (FIG. 7).

In a second step 172, channel allocation table 142 is inspected to find all channels having a rate $r_i \leq RR_k$, and the channel with the maximum rate $r_i$ and obeying the inequality is selected.

If more than one channel complies with the conditions of step 172, then one of these channels is chosen, by a method which generates, over time, a uniform distribution of the channels complying with step 172. Such a method may comprise a random choice of channels complying with step 172.

In a final step 174, entries for call k are entered into packet call table 140, using the value of $CI_k$ from procedure 150. The entries for $A_k$ and $RR_k$ for table 140 are set to be the same as the respective entries for $H_i$ and $r_i$ in table 142.

Figure 10:
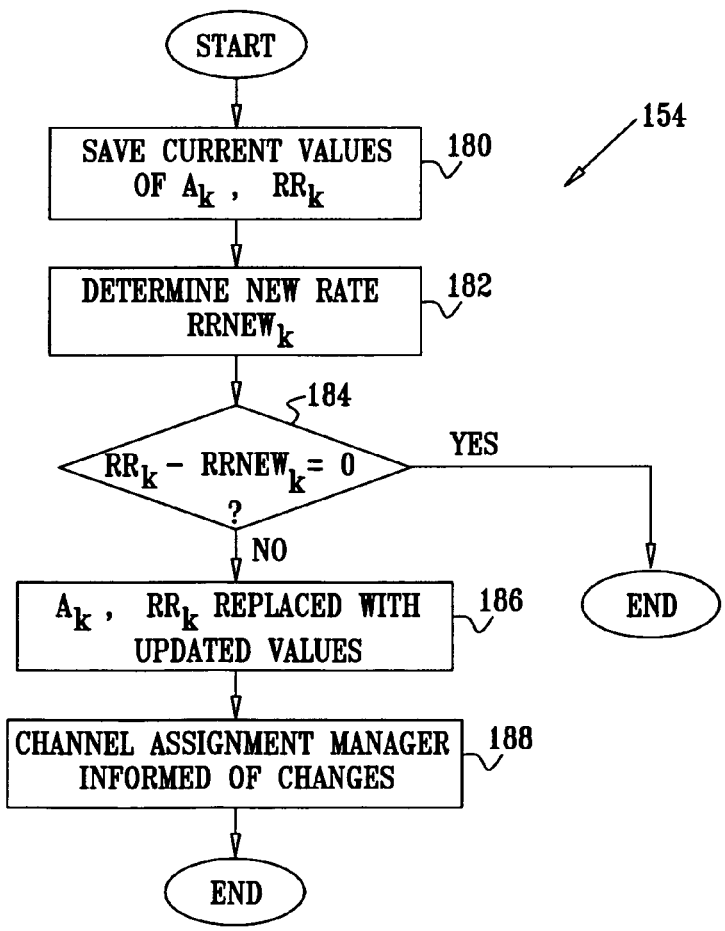
FIG. 10 is a flowchart showing steps comprised in a packet rate change procedure, according to an embodiment of the present invention.

FIG. 10 is a flowchart showing steps comprised in packet rate change procedure 154 (FIG. 8), according to an embodiment of the present invention. Scheduler 64 implements procedure 154 periodically, in a period typically equal to a multiple of a time slot used by scheduler process 162. Procedure 154 checks radio conditions of each active packet call k in table 140 to determine if the rate $RR_k$ assigned to the call needs to change.

In a first step 180, scheduler 64 saves the current values of $A_k$ and $RR_k$.

In a second step 182, scheduler 64 determines a new rate $RRnew_k$ for the call, by implementing steps 170 and 172 of channel determination process 158 (FIG. 9).

In a decision step 184, the scheduler determines if there is a difference between $RR_k$ and $RRnew_k$. If there is no difference, procedure 154 terminates and table 140 is not altered. Procedure 154 then processes a new call in table 140.

If there is a difference, then in a step 186, corresponding to step 174 of process 158, is implemented, replacing $A_k$ and $RR_k$ with updated values.

In a final step 188, scheduler 64 informs core manager 60 (FIG. 3) of the changes in $A_k$ and $RR_k$. Manager 60 sends notifications of the changes, as described above with reference to procedure 150.

Figure 11:
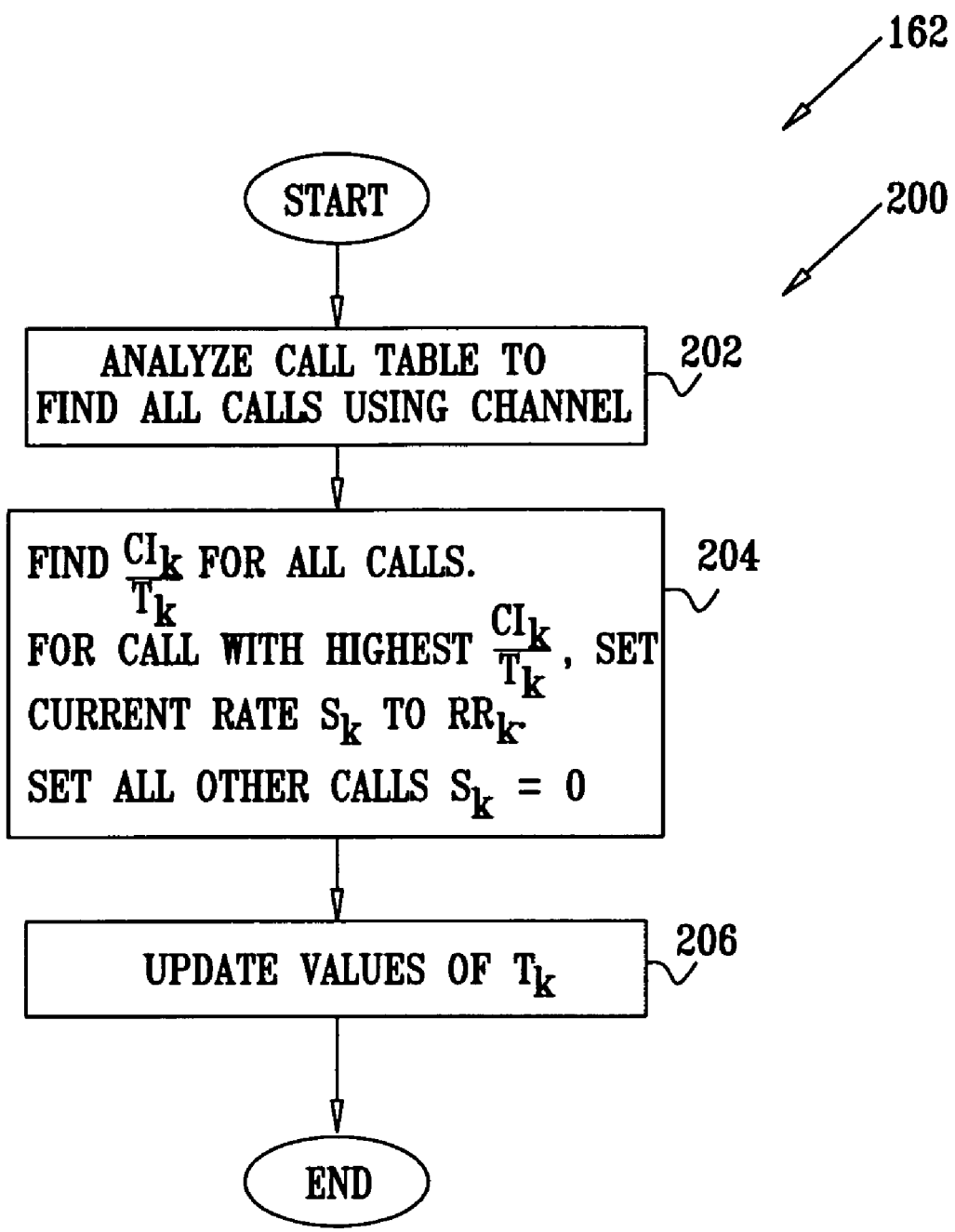
FIG. 11 is a flowchart showing steps used by a proportional fair scheduler, according to an embodiment of the present invention.

FIG. 11 is a flowchart 200 showing steps used by proportional fair scheduler process 162, according to an embodiment of the present invention. Scheduler process 162 time multiplexes each assigned supplemental channel of channel allocation table 142. As is shown in call table 140, each channel carries a number of calls. The multiplexing selects which call k using the channel is to be transmitted in a specific time slot n. In addition to performing the selection, the multiplexing system used by scheduler process 162 maximizes a product of the throughput rates delivered to all users of system 10.

At initialization of system 10 the operator of the system assigns a pre-set value to a time constant $t_C$ used by scheduler process 162.

In the following description, the average data throughput rate $T_k$, the data throughput rate $S_k$, and the $CI_k$ for call k are indexed with n. Thus, $T_k[n]$ represents the average data throughput rate up to time slot n, and $S_k[n]$ and $CI_k[n]$ respectively represent the data throughput rate and $$\frac{\text{Carrier}}{\text{Interference}}$$

value in time slot n. Scheduler process 162 applies the steps of flowchart 200 to each supplemental channel in channel allocation table 142.

In a first step 202, scheduler process 162 analyzes table 140 to find all packet data calls that are listed as using the channel, i.e., all calls having an identical $A_k$, and that have data to send, so that data queue 53 is not empty.

In a second step 204, scheduler process 162 calculates the values of $$\frac{CI_k[n]}{T_k[n]}$$

for each call found in step 202. For the call with the highest value of $$\frac{CI_k[n]}{T_k[n]},$$

scheduler process 162 sets $S_k[n]=RR_k$, and for the other calls found in step 202, $S_k[n]=0$.

In a final step 206, the values of $T_k[n]$ are updated for each of the calls selected in step 202, using the values of $S_k[n]$ set in step 204, according to equation (3):

$$T_k[n+1] = \left(1 - \frac{1}{t_c}\right) \cdot T_k[n] + \left(\frac{1}{t_c}\right) \cdot S_k[n] \quad (3)$$

It will be apparent from consideration of flowchart 200 that step 204 chooses the call within the specific channel being processed that is to be transmitted in time slot n, i.e., the call with the highest value of $$\frac{CI_k[n]}{T_k[n]}.$$

This call typically has a minimum value of $T_k[n]$ for all calls allocated to the channel, since the allocation ensures that all calls have approximately equal values of $CI_k[n]$.

Step 206 reduces the value of $T_k[n]$ for all calls except the chosen call, since $S_k[n]$ is assigned to be 0 for these calls. The amount of reduction is a function of $t_C$. Steps 204 and 206 taken together maximize a product of throughput rates $T_k$ for all the mobiles of a channel, leading to a proportionally fair distribution of the throughput rates.

By applying flowchart 200 a new user of a channel typically receives data packet service at the expense of existing users, since the new user has an initial low value of $T_k$. This is advantageous on a short term basis, since the new user receives an "initial burst" of data without significantly affecting previous users. However, if the new user continues to receive data, the previous users may be adversely affected.

Some embodiments of the present invention limit the initial burst by assigning an initial value of $$\frac{CI_k[n]}{T_k[n]}$$

to a new user. Typically, the initial value of $$\frac{CI_k[n]}{T_k[n]}$$

is set to be a multiple of an average value of the existing $$\frac{CI_k[n]}{T_k[n]}$$

values. Preferably, the multiple is set to be between approximately 1 and approximately 2.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for transmitting data in a code division multiple access (CDMA) communication network, comprising:
   allocating a common Walsh code to a group of transceivers, the group of transceivers being grouped together based upon a mutual data rate;
   allocating a respective, different long code to each transceiver in the group, the long code being specific to the transceiver in the group and enabling only the specific transceiver in the group to decode the data that was intended for said specific transceiver; and
   time-multiplexing transmission of the data to the transceivers in the group by applying the common Walsh code and the respective long code of each transceiver to data packets directed to the transceivers so as to form multiplexed data packets, and transmitting the multiplexed data packets in sequence over the network to the group of transceivers, wherein the transceivers in the group have respective data throughput rates, and wherein transmitting the multiplexed data packets comprises identifying a specific transceiver in the group having a minimum data throughput rate among the data throughput rates of the transceivers in the group, and applying the respective long code to transmit at least one multiplexed data packet to the specific transceiver.

2. The method according to claim 1, wherein the transceivers are wireless and comprise mobile transceivers in a cellular network.

3. The method according to claim 1, wherein the transceivers are wired and comprise landline transceivers in a communication network.

4. The method according to claim 1, wherein the transceivers are configured to receive the multiplexed data packets at a common data transfer rate.

5. The method according to claim 1, wherein the transceivers are adapted to communicate using one or more voice channels and one or more data channels, and wherein the common Walsh code defines one of the data channels.

6. A method for transmitting data in a code division multiple access (CDMA) communications network, comprising:
   allocating a plurality of different Walsh codes to respective sets of transceivers, the sets of transceivers being grouped together based upon a mutual data rate;
   allocating a respective, different long code to each of the transceivers in the sets, the long code being specific to the transceiver in the set and enabling only the specific transceiver in the set to decode the data that was intended for said specific transceiver; and
   for each Walsh code, time-multiplexing transmission of the data to the transceivers in the respective set by applying the Walsh code and the respective long code of each transceiver of the respective set to data packets directed to the transceivers so as to form multiplexed data packets, and transmitting the multiplexed data packets in sequence over the network to the sets of transceivers, wherein allocating the plurality of different Walsh codes comprises measuring a voice-channel power used by a central transmitter for transmitting voice channels to the transceivers, and allocating and de-allocating at least one of the different Walsh codes in response to at least one of an excess power available to the central transmitter above the voice-channel power.

7. The method according to claim 6, wherein allocating the plurality of different Walsh codes comprises allocating and de-allocating at least one of the different Walsh codes in response to at least one of an additional Walsh code available to the transmitter, and cell site modem resources available to the transmitter.

8. The method according to claim 6, further comprising assigning and de-assigning at least one of the different Walsh codes to a specific receiver comprised in the transceivers in response to a data call directed to the specific receiver.

9. The method according to claim 6, further comprising assigning each set of transceivers to two or more groups of transceivers, and assigning each group to receive the data at a different respective data transfer rate.

10. The method according to claim 9, further comprising setting, for each group, the different transfer rate in response to a radio receiving condition of the group at a central transceiver for the transceivers.

11. The method according to claim 9, further comprising re-allocating a specific transceiver comprised in a first group comprised in the two or more groups to a second group comprised in the two or more groups in response to radio conditions at the specific transceiver.

12. Apparatus for transmitting data in a code division multiple access (CDMA) network, the apparatus comprising:
   a channel manager which is adapted to:
   allocate a common Walsh code to a group of, the group of transceivers being grouped together based upon a mutual data rate, and
   allocate a respective, different long code to each transceiver in the group, the long code being specific to the transceiver in the group and enabling only the specific transceiver in the group to decode the data that was intended for said specific transceiver; and
   a radio transmitter, which is adapted to:
   time-multiplex transmission of the data to the transceivers in the group by applying the common Walsh code and the respective long code of each transceiver to data packets directed to the transceivers so as to form multiplexed data packets, and transmit the multiplexed data packets in sequence over the network to the group of transceivers, wherein the transceivers in the group have respective data throughput rates, and wherein the radio transmitter is adapted to identify a specific transceiver in the group having a minimum data throughput rate among the data throughout rates of the transceivers in the group, and apply the respective long code to transmit at least one multiplexed data packet to the specific transceiver.

13. The apparatus according to claim 12, wherein the transceivers are wireless and comprise mobile transceivers in a cellular network.

14. The apparatus according to claim 12, wherein the transceivers are wired and comprise landline transceivers in a communication network.

15. The apparatus according to claim 12, wherein transmitting the multiplexed data packets comprises transmitting the multiplexed data packets at a common data transfer rate.

16. The apparatus according to claim 12, wherein the transceivers are adapted to communicate using one or more voice channels and one or more data channels, and wherein the common Walsh code defines one of the data channels.

17. Apparatus for transmitting data in a code division multiple access (CDMA) communications network, comprising:
a channel manager which is adapted to:
allocate a plurality of different Walsh codes to respective sets of transceivers, the sets of transceivers being grouped together based upon a mutual data rate, and
allocate a respective, different long code to each of the transceivers in the sets, the long code being specific to the transceiver in the set and enabling only the specific transceiver in the set to decode the data that was intended for said specific transceiver; and
a radio transmitter, which is adapted, for each Walsh code, to:
time-multiplex transmission of the data to the transceivers in the respective set by applying the Walsh code and the respective long code of each transceiver of the respective set to data packets directed to the transceivers so as to form multiplexed data packets, and
transmit the multiplexed data packets in sequence over the network to the group of transceivers, wherein allocating the plurality of different Walsh codes comprises measuring a voice-channel power used by the radio transmitter for transmitting voice channels to the transceivers, and allocating and de-allocating at least one of the different Walsh code in response to at least one of an excess power available to the radio transmitter above the voice-channel power.

18. The apparatus according to claim 17, wherein allocating the plurality of different Walsh codes comprises allocating and de-allocating at least one of the different Walsh code in response to at least one of an additional Walsh code available to the transmitter, and cell site modem resources available to the transmitter.

19. The apparatus according to claim 17, wherein the channel manager is adapted to assign and de-assign at least one of the different Walsh codes to a specific receiver comprised in the transceivers in response to a data call directed to the specific receiver.

20. The apparatus according to claim 17, wherein the channel manager is adapted to assign each set of the transceivers two or more groups of transceivers, and wherein the radio transmitter is adapted to transmit the data to each group at a different respective data transfer rate.

21. The apparatus according to claim 20, wherein the radio transmitter is adapted to set, for each group, the different transfer rate in response to a radio receiving condition of the group at the radio transmitter.

22. The apparatus according to claim 20, wherein the channel manager is adapted to re-allocate a specific transceiver comprised in a first group comprised in the two or more groups to a second group comprised in the two or more groups in response to radio conditions at the specific transceiver.

23. An apparatus for transmitting data in a code division multiple access (CDMA) communication network, comprising:
means for allocating a common Walsh code to a group of transceivers, the group of transceivers being grouped together based upon a mutual data rate;
means for allocating a respective, different long code to each transceiver in the group, the long code being specific to the transceiver in the group and enabling only the specific transceiver in the group to decode the data that was intended for said specific transceiver; and
means for time-multiplexing the data to the transceivers in the group by applying the common Walsh code and the respective long code of each transceiver to data packets directed to the transceivers so as to form multiplexed data packets, and
means for transmitting the multiplexed data packets in sequence over the network to the group of transceivers, wherein the transceivers in the group have respective data throughput rates, and wherein the means for transmitting the multiplexed data packets comprises means for identifying a specific transceiver in the group having a minimum data throughput rate among the data throughput rates of the transceivers in the group, and means for applying the respective long code to transmit at least one multiplexed data packet to the specific transceiver.

24. The apparatus according to claim 23, wherein the transceivers are wireless and comprise mobile transceivers in a cellular network.

25. The apparatus according to claim 23, wherein the transceivers are wired and comprise landline transceivers in a communication network.

26. The apparatus according to claim 23, wherein the transceivers are configured to receive the multiplexed data packets at a common data transfer rate.

27. The apparatus according to claim 23, wherein the transceivers are adapted to communicate using one or more voice channels and one or more data channels, and wherein the common Walsh code defines one of the data channels.

28. A computer-readable medium comprising instructions for transmitting data in a code division multiple access (CDMA) communication network, the instructions when read and executed for causing a computer to:
allocate a common Walsh code to a group of transceivers, the group of transceivers being grouped together based upon a mutual data rate;
allocate a respective, different long code to each transceiver in the group, the long code being specific to the transceiver in the group and enabling only the specific transceiver in the group to decode the data that was intended for said specific transceiver; and
time-multiplex transmission of the data to the transceivers in the group by applying the common Walsh code and the respective long code of each transceiver to data packets directed to the transceivers so as to form multiplexed data packets, and transmit the multiplexed data packets in sequence over the network to the group of transceivers, wherein the transceivers in the group have respective data throughput rates, and wherein the instructions that cause the computer to transmit the multiplexed data packets further cause the computer to identify a specific transceiver in the group having a minimum data throughput rate among the data throughput rates of the transceivers in the group, and apply the respective long code to transmit at least one multiplexed data packet to the specific transceiver.

29. The computer readable medium according to claim 28, wherein the transceivers are wireless and comprise mobile transceivers in a cellular network.

30. The computer readable medium according to claim 28, wherein the transceivers are wired and comprise landline transceivers in a communication network.

31. The computer readable medium according to claim 28, wherein the transceivers are configured to receive the multiplexed data packets at a common data transfer rate.

32. The computer readable medium according to claim 28, wherein the transceivers are adapted to communicate using one or more voice channels and one or more data channels, and wherein the common Walsh code defines one of the data channels.

33. A computer readable medium for transmitting data in a code division multiple access (CDMA) communications network, comprising instructions that when read by a computer case the computer to:

allocate a plurality of different Walsh codes to respective sets of transceivers, the sets of transceivers being grouped together based upon a mutual data rate;

allocate a respective, different long code to each of the transceivers in the sets, the long code being specific to the transceiver in the set and enabling only the specific transceiver in the set to decode the data that was intended for said specific transceiver;

measure a voice-channel power used by a central transmitter for transmitting voice channels to the transceivers, and to allocate and de-allocate at least one of the different Walsh codes in response to at least one of an excess power available to the central transmitter above the voice-channel power; and for each Walsh code, time-multiplex transmission of the data to the transceivers in the respective set by applying the Walsh code and the respective long code of each transceiver of the respective set to data packets directed to the transceivers so as to form multiplexed data packets, and transmit the multiplexed data packets in sequence over the network to the sets of transceivers.

34. The computer readable medium according to claim 33, wherein the instructions that, when read and executed, cause the computer to allocate the plurality of different Walsh codes further cause the computer to allocate and de-allocate at least one of the different Walsh codes in response to an additional Walsh code available to the transmitter, and cell site modem resources available to the transmitter.

35. The computer readable medium according to claim 33, further comprising instructions that, when read and executed, cause the computer to assign and de-assign at least one of the different Walsh codes to a specific receiver comprised in the transceivers in response to a data call directed to the specific receiver.

36. The computer readable medium according to claim 33, further comprising instructions that, when read and executed, cause the computer to assign each set of transceivers to two or more groups of transceivers, and assign each group to receive the data at a different respective data transfer rate.

37. The computer readable medium according to claim 36, further comprising instructions that, when read and executed, cause the computer to set, for each group, the different transfer rate in response to a radio receiving condition of the group at a central transceiver for the transceivers.

38. The computer readable medium according to claim 36, further comprising instructions that, when read and executed, cause the computer to re-allocate a specific transceiver comprised in a first group comprised in the two or more groups to a second group comprised in the two or more groups in response to radio conditions at the specific transceiver.

* * * * *